US011603022B2

(12) United States Patent
Beuschel et al.

(10) Patent No.: US 11,603,022 B2
(45) Date of Patent: Mar. 14, 2023

(54) VALVE CONFIGURATION PARTS KIT AND PNEUMATIC ADJUSTMENT DEVICE HAVING A PARTS KIT OF THIS TYPE

(71) Applicant: Conti Temic Microelectronic GmbH, Nuremberg (DE)

(72) Inventors: Michael Beuschel, Munich (DE); Stefan Bauer, Munich (DE)

(73) Assignee: Conti Temic Microelectronic GmbH

( * ) Notice: Subject to any disclaimer, the term of this patent is extended or adjusted under 35 U.S.C. 154(b) by 190 days.

(21) Appl. No.: 17/075,114

(22) Filed: Oct. 20, 2020

(65) Prior Publication Data

US 2021/0114497 A1 Apr. 22, 2021

(30) Foreign Application Priority Data

Oct. 22, 2019 (DE) ...................... 10 2019 216 243.6

(51) Int. Cl.
*B60N 2/90* (2018.01)
*F16K 11/10* (2006.01)
*F16K 27/02* (2006.01)

(52) U.S. Cl.
CPC .............. *B60N 2/914* (2018.02); *F16K 11/10* (2013.01); *F16K 27/0281* (2013.01)

(58) Field of Classification Search
CPC ...... B60N 2/617; F16K 11/10; F16K 27/0281
See application file for complete search history.

(56) References Cited

U.S. PATENT DOCUMENTS

| 10,711,911 B2 | 7/2020 | Beuschel et al. |
| 2012/0143108 A1 | 6/2012 | Bocsanyi |
| 2014/0230921 A1 | 8/2014 | Bocsanyi |
| 2014/0232155 A1* | 8/2014 | Bocsanyi ............... B60N 2/914 297/284.6 |

(Continued)

FOREIGN PATENT DOCUMENTS

| DE | 102015219207 B3 | 2/2017 |
| EP | 2769878 A1 | 8/2014 |

(Continued)

OTHER PUBLICATIONS

German Examination Report for German Application No. 10 2019 216 243.6, dated Jul. 22, 2020, 3 pages.

(Continued)

*Primary Examiner* — Syed A Islam
(74) *Attorney, Agent, or Firm* — RatnerPrestia (57) ABSTRACT

A valve configuration parts kit for providing at least two valve configurations, including: a first plate-shaped main body, a plurality of wall-type webs attached to the plate-shaped main body which, conjointly with the plate-shaped main body, at least in part define fluid paths, and a second main body attached to the first main body, or a third main body attached to the first main body. The second main body contacts a first sub-quantity of the plurality of webs such that the first main body, the second main body, and the first sub-quantity define a first fluid path system for providing a first valve configuration. The third main body contacts a second sub-quantity of the plurality of webs such that the first main body, the third main body, and the second sub-quantity define a second fluid path system for providing a second valve configuration.

9 Claims, 3 Drawing Sheets

(56) References Cited

U.S. PATENT DOCUMENTS

2018/0222370 A1    8/2018    Kerler et al.
2020/0069508 A1*    3/2020    Watson ................ A61H 9/0071

FOREIGN PATENT DOCUMENTS

EP          3489512 A1    5/2019
WO       2012159688 A1    11/2012

OTHER PUBLICATIONS

Chinese Office Action with Search Report for Chinese Application No. 202011138580.2, dated Jul. 19, 2022, with translation, 21 pages.

* cited by examiner

VALVE CONFIGURATION PARTS KIT AND PNEUMATIC ADJUSTMENT DEVICE HAVING A PARTS KIT OF THIS TYPE

CROSS REFERENCE TO RELATED APPLICATIONS

This application claims priority to German Patent Application No. 10 2019 216 243.6, filed Oct. 22, 2019, the contents of such application being incorporated by reference herein.

FIELD OF THE INVENTION

The present invention relates to a valve configuration parts kit for a pneumatic adjustment device of a vehicle seat as well as to a pneumatic adjustment device having a valve configuration parts kit of this type.

BACKGROUND OF THE INVENTION

In modern vehicle seats, fluid bladders or fluid chambers which can be filled with a pressure medium, in particular with a gaseous pressure medium such as compressed air, are situated as actuating elements in the region of the seat surface or backrest (together also referred to as seat contact face). These fluid chambers are a component part of a pneumatic adjustment device which is individually adaptable to the respective specific application and are supplied with the pressure medium by way of respective pressure medium lines. The volume of said fluid chambers is increased by filling a respective fluid chamber with pressure medium, or decreased by emptying said fluid chamber, respectively, such that the properties of the seat contact face, in particular the contour of the latter, can be varied. Suitable valves are typically used for filling or emptying, respectively, the respective fluid chamber, the pneumatic functionality of said valves having to be individually adapted to the specific application.

In this type of individual adaptation it is problematic that the suitable valves for each pneumatic adjustment device have to be selected and then individually pneumatically connected as a function of the desired function of said pneumatic adjustment device, for example only maintaining pressure or else a massage function. This takes time and increases the production costs for the corresponding pneumatic adjustment device.

SUMMARY OF THE INVENTION

Therefore an aspect of the present invention is to provide a simple and cost-effective valve configuration parts kit by way of which different connection diagrams of pneumatic valves, or different valve configurations, respectively, for a pneumatic adjustment device of a vehicle seat are enabled. It is furthermore an aspect of the present invention to provide a pneumatic adjustment device having a valve configuration parts kit of this type.

According to a first aspect of the invention, a valve configuration parts kit for providing at least two valve configurations for a pneumatic adjustment device of a vehicle seat is provided. A first valve configuration herein can be the preferred valve configuration for a first pneumatic adjustment device, for example, and a second valve configuration can be a preferred valve configuration for a second pneumatic adjustment device, for example. The valve configuration parts kit comprises the following components: a first plate-shaped main body, a plurality of wall-type webs which are attached to the plate-shaped main body and extend from the plate-shaped main body and which, conjointly with the plate-shaped main body, at least in part define fluid paths for a fluid that flows between the webs, and a second main body which is attached to the first main body, or a third main body which is attached to the first main body. The second main body herein is attached to the first main body in such a manner that the second main body contacts a first sub-quantity of the plurality of webs in a fluid-tight manner such that the first main body, the second main body, and the first sub-quantity of the plurality of webs define a first fluid path system for providing a first valve configuration. Furthermore, the third main body is attached to the first main body in such a manner that the third main body contacts a second sub-quantity, different from the first sub-quantity, of the plurality of webs in a fluid-tight manner such that the first main body, the third main body and the second sub-quantity of the plurality of webs define a second fluid path system, which is different from the first fluid path system, said second fluid path system providing a second valve configuration, different from the first valve configuration. In other words, the second main body and the third main body in the valve configuration parts kit can be mutually swapped in order to achieve a respective valve configuration for a respective pneumatic adjustment device.

An aspect of the invention herein is at least in part based on the concept that a plurality of valve configurations for a plurality of pneumatic adjustment devices are able to be provided by way of only a single valve configuration parts kit. On account thereof it is possible for the respective different requirements set for the pneumatic functions of the respective pneumatic adjustment device to be provided in a rapid and cost-effective manner by means of a single parts kit. An aspect of the invention is furthermore at least in part based on the concept that a valve configuration parts kit of this type can be provided in a simple and cost-effective manner in that a single first plate-shaped main body having a plurality of webs disposed thereon is used, and that further interchangeable main bodies (second main body or third main body) are attached to this single plate-shaped main body when required, said further interchangeable main bodies contacting either only a first sub-quantity or only a second sub-quantity of webs in such a manner that a first or a second valve configuration is generated. In the context of this disclosure, the term "first sub-quantity of the plurality of webs" refers to a first group of webs which in the first valve configuration are contacted by the second main body in a fluid-tight manner, and the term "second sub-quantity of the plurality of webs" refers to a second group of webs which in the second valve configuration are contacted by the third main body in a fluid-tight manner. The first group, or the first sub-quantity, respectively, of the webs, and the second group, or the second sub-quantity, respectively, of the webs herein can readily comprise webs which are present in the first sub-quantity as well as in the second sub-quantity of webs. However, not all members of the first sub-quantity of webs are identical to all members of the second sub-quantity of webs. This means that the first sub-quantity of webs comprises at least one web which is not also a member of the second sub-quantity of webs. In other words, the first sub-quantity and the second sub-quantity of webs differ in terms of at least one web which is not a member of both the first sub-quantity as well as the second sub-quantity of webs.

A valve configuration which is correspondingly adapted to the respective specific application is provided for a respective pneumatic adjustment device in that the interchangeable main bodies (second main body and third main body) contact in each case other sub-quantities of webs in a fluid-tight manner. On account thereof the costs for providing different valve configurations as well as for providing different pneumatic functions for dissimilar pneumatic adjustment devices are significantly reduced.

In one design embodiment of the valve configuration parts kit according to an aspect of the invention the second main body and the third main body are configured in a single main body element, and the single main body element in a first installed position contacts the first sub-quantity of the plurality of webs in a fluid-tight manner such that the first valve configuration is defined or generated, respectively, and the single main body element in a second installed position contacts the second sub-quantity of the plurality of webs in a fluid-tight manner such that the second valve configuration is defined or generated, respectively. This design embodiment is particularly simple and cost-saving since only a single main body element is now used instead of two separate main bodies, said single main body element as a function of the installed position generating the desired valve configuration for the respective pneumatic adjustment device.

According to one further design embodiment the webs in the direction of extent have the same height, and the second main body for forming the first fluid path system enables an overflow of the fluid only at predetermined first webs, and the third main body for forming the second fluid path system enables an overflow of the fluid only at predetermined (other) second webs. In other words, the respective main body (second main body or third main body) or the main body element, respectively, in the respective installed position (first installed position or second installed position) enables an overflow of the fluid either at predetermined first webs or at predetermined second webs. For example, the overflow by way of the predetermined first and second webs can be generated in that respective overflow ducts which permit a targeted overflow only by way of the predetermined first webs or second webs, respectively, are configured at the first/second installed position in the second/third main body, or in the main body element, respectively. The first and second webs herein again differ in terms of at least one web which is not both a member of the first webs as well as a member of the second webs.

According to one further design embodiment of the valve configuration parts kit according to an aspect of the invention, the functionality of two 3/2 valves is enabled in the first valve configuration, and the functionality of one 3/3 valve is enabled in the second valve configuration. It is possible on account thereof in the first valve configuration, for example, that two fluid bladders, or fluid chambers, respectively, can be filled or emptied, respectively, in a mutually independent manner. This is particularly advantageous in the case of massage system in which the pressure is not maintained or maintained only for a short time. By virtue of the functionality of a 3/3 valve in the second valve configuration, for example, a single fluid bladder can be selectively filled and emptied, and the pressure in the fluid bladder can be maintained, on the other hand. This is particularly advantageous in the case of systems in which pressure for the static seat contour adjustment is maintained for a long time.

According to one further design embodiment, the first fluid path system which in the first valve configuration is defined by the first main body, the second main body, and the first sub-quantity of the plurality of webs comprises the following components: an admission-pressure chamber which is able to be fluidically connected to a fluid source; a first valve chamber which by way of a first valve element is fluidically connected to the admission-pressure chamber and is able to be fluidically connected to a first fluid bladder of the pneumatic adjustment device; and a second valve chamber which is fluidically separated from the first valve chamber and by way of a second valve element is fluidically connected to the admission-pressure chamber and is able to be fluidically connected to a second fluid bladder of the pneumatic adjustment device. In this design embodiment, two fluid bladders in the first valve configuration of the valve configuration parts kit can thus be filled or emptied, respectively, in a mutually separate manner, for example. This is particularly advantageous in the case of massage systems.

According to one further design embodiment, the second fluid path system which in the second valve configuration is defined by the first main body, the third main body, and the second sub-quantity of the plurality of webs comprises the following components: an admission-pressure chamber which is able to be fluidically connected to a fluid source; a first valve chamber which by way of a first valve element is fluidically connected to the admission-pressure chamber; a second valve chamber which is fluidically connected to the first valve chamber and a third valve chamber which by way of a second valve element is fluidically connected to the second valve chamber and is able to be fluidically connected to a fluid bladder. In this design embodiment, a single fluid bladder can be selectively filled and emptied, and the pressure in the fluid bladder can be maintained, in the second valve configuration of the valve configuration parts kit. This is particularly advantageous in the case of systems in which pressure for the static seat contour adjustment is maintained for a long time.

In one preferred design embodiment the valve configuration parts kit moreover comprises a first valve element, in particular a first 3/2 valve element, which in the first valve configuration as well as in the second valve configuration fluidically connects the admission-pressure chamber to the first valve chamber, as well as a second valve element, in particular a second 3/2 valve element, which in the first valve configuration fluidically connects the admission-pressure chamber to the second valve chamber, and in the second valve configuration fluidically connects the second valve chamber to the third valve chamber.

According to a second aspect of the present invention, a pneumatic adjustment device for adjusting a contour of a seat contact face of a vehicle seat is provided. The pneumatic adjustment device according to the second aspect comprises the following components: a valve configuration parts kit according to the first aspect, wherein said valve configuration parts kit provides the first valve configuration; a fluid source which is fluidically connected to the admission-pressure chamber; a first fluid bladder for adjusting the contour of the seat contact face; and a second fluid bladder for further adjusting the contour of the seat contact face; wherein in the first valve configuration of the valve configuration parts kit the first fluid bladder is fluidically connected to the first valve chamber, and the second fluid bladder is fluidically connected to the second valve chamber.

According to a third aspect of the present invention, a pneumatic adjustment device for adjusting a contour of a seat contact face of a vehicle seat is provided. The pneumatic adjustment device according to the third aspect comprises the following components: a valve configuration parts kit according to the first aspect, wherein said valve configuration parts kit provides the second valve configuration; a fluid source which is fluidically connected to the admission-pressure chamber; and a fluid bladder for adjusting the contour of the seat contact face, wherein in the second valve configuration of the valve configuration parts kit the fluid bladder is fluidically connected to the third valve chamber.

The pneumatic adjustment device according to the second aspect thus enables controlled filling and emptying of two separate fluid bladders. As opposed thereto, the pneumatic adjustment device according to the third aspect enables controlled filling, emptying, and maintaining pressure of a single fluid bladder. Depending on whether the second main body or the third main body is used, both pneumatic adjustment devices can thus be achieved with the aid of the same valve configuration parts kit.

BRIEF DESCRIPTION OF THE DRAWINGS

Further features and aspects of the present invention will become apparent to a person skilled in the art by practicing the present teaching and taking into consideration the accompanying drawings. In the drawings.

Elements of identical design or function are provided with the same reference signs across all figures.

DETAILED DESCRIPTION OF THE PREFERRED EMBODIMENTS

Figure 1:
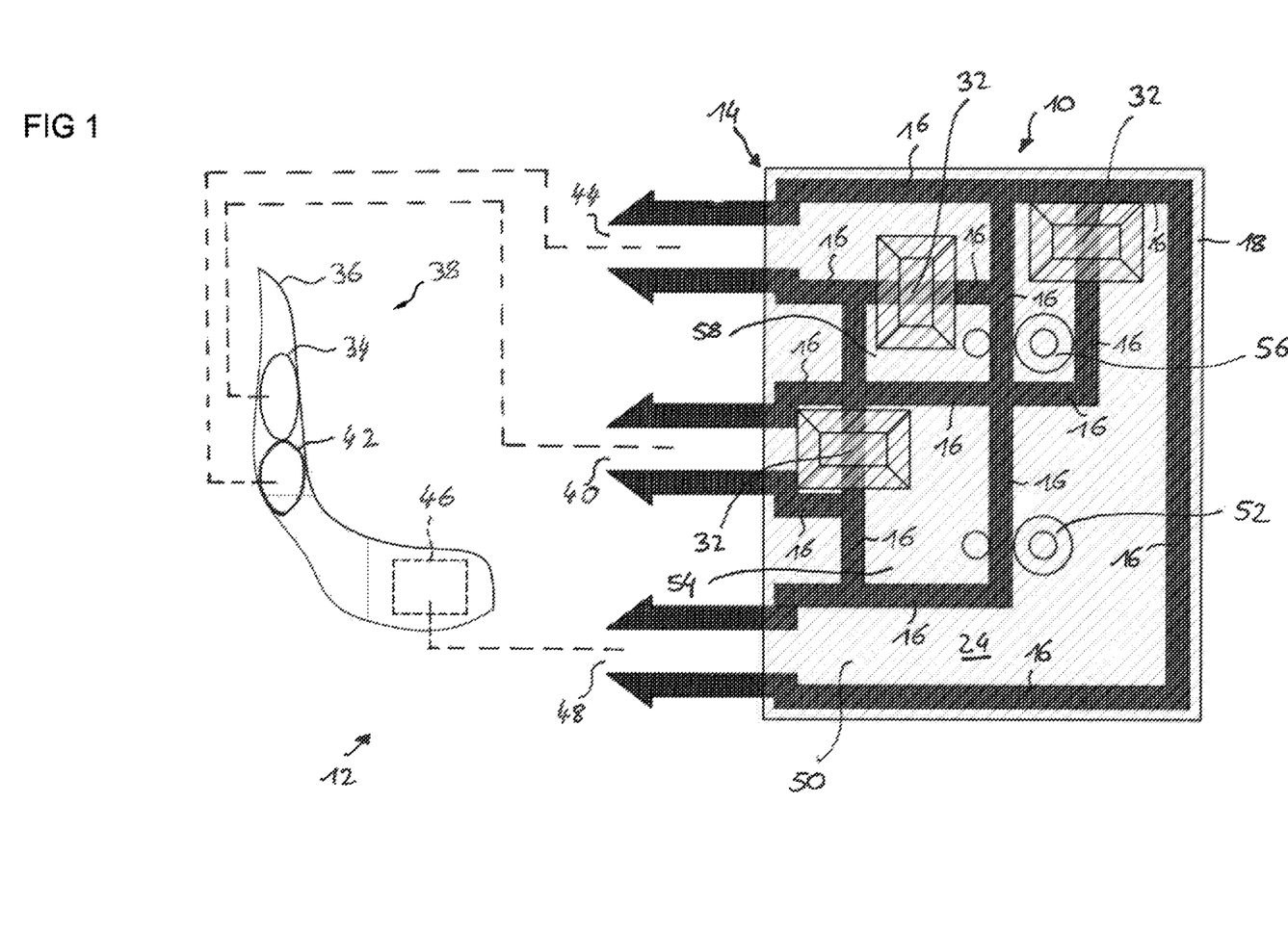
FIG. 1 shows a schematic view of an embodiment of a valve configuration parts kit according to an aspect of the invention, said valve configuration parts kit being used in a pneumatic adjustment device according to an aspect of the invention.
Figure 2:
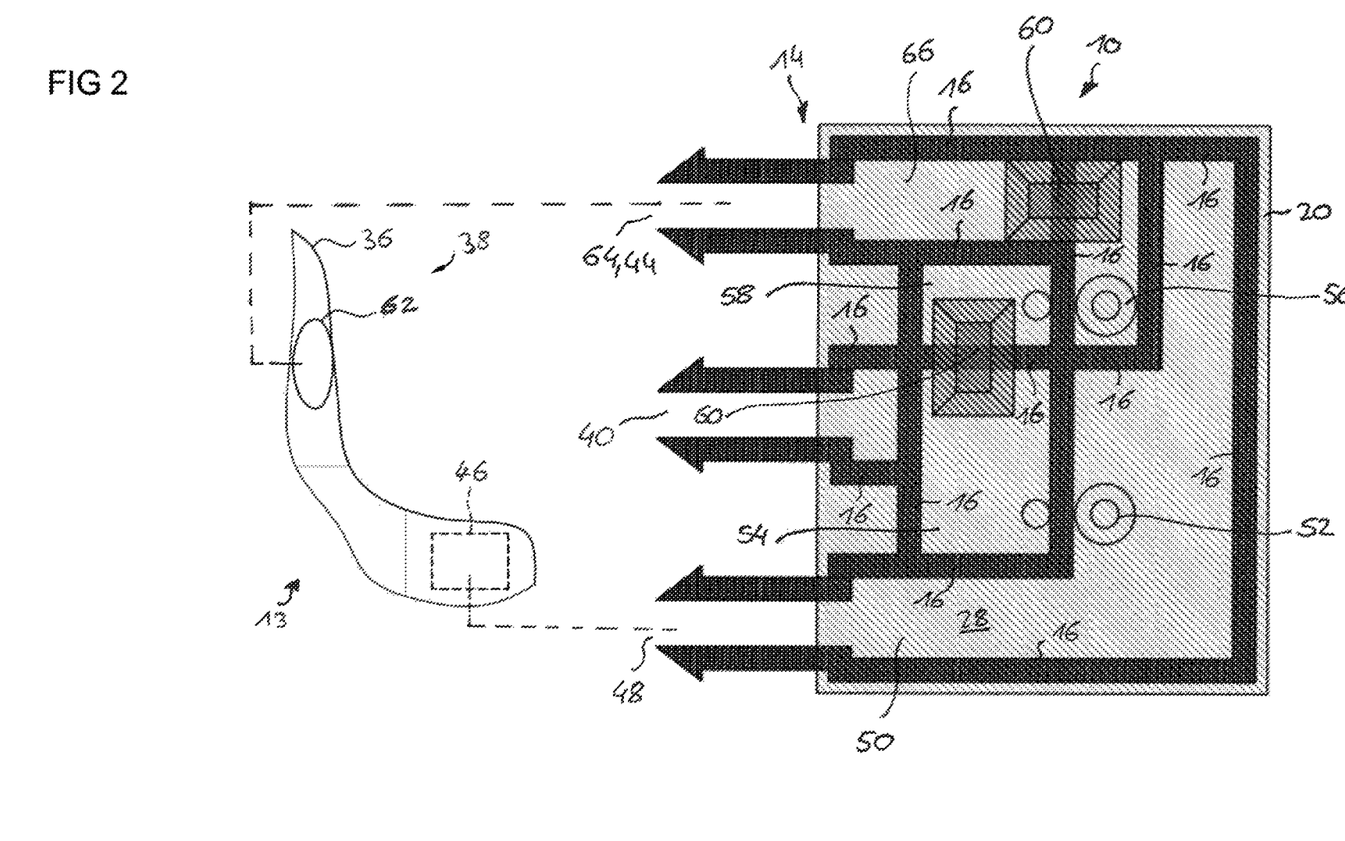
FIG. 2 shows a schematic view of a further embodiment of a valve configuration parts kit according to an aspect of the invention, said valve configuration parts kit being used in a further embodiment of a pneumatic adjustment device according to an aspect of the invention.

Reference is first to be made to FIG. 1 which shows a schematic view of a valve configuration parts kit 10. The valve configuration parts kit 10 can provide at least two different valve configurations for pneumatic adjustment devices. A first valve configuration of the valve configuration parts kit 10 is shown in FIG. 1, said first valve configuration being used in a first pneumatic adjustment device 12. A second valve configuration of the valve configuration parts kit 10 is shown in FIG. 2, said second valve configuration being different from the first valve configuration and being used in a second pneumatic adjustment device 13.

The individual pneumatic adjustment devices 12, 13 will be described in more detail in the context of FIGS. 1 and 2. In order for the construction of the valve configuration parts kit 10 to be explained in more detail, reference is however first made to FIGS. 3 and 4.

Figure 3:
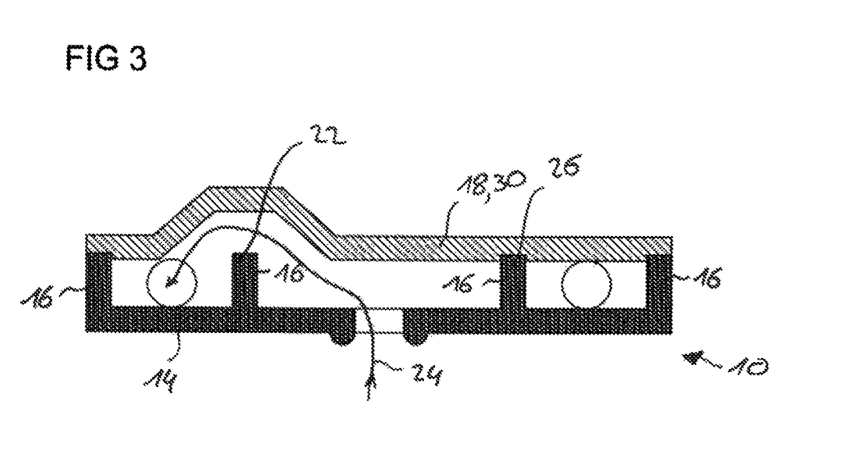
FIG. 3 shows a schematic view of a further embodiment of a valve configuration parts kit according to an aspect of the invention, in which a first valve configuration is implemented.
Figure 4:
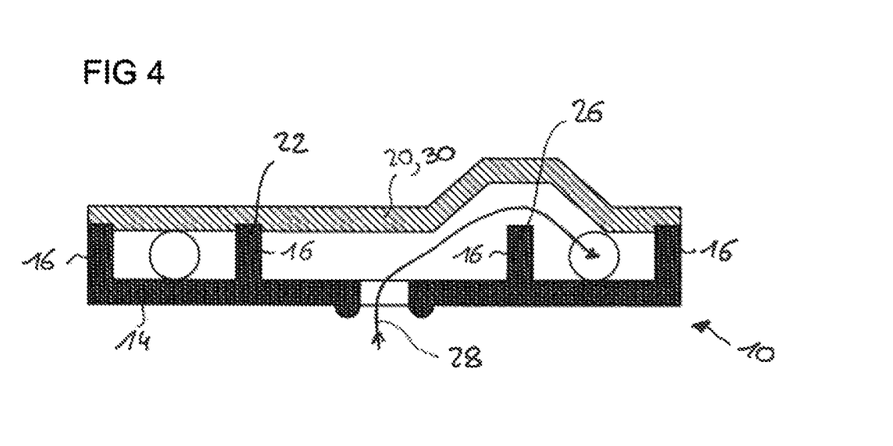
FIG. 4 shows a schematic view of a further embodiment of a valve configuration parts kit according to an aspect of the invention, in which a second valve configuration is implemented.

FIG. 3 shows a schematic view of the valve configuration parts kit 10 in which a first valve configuration is implemented. FIG. 4 shows a schematic view of the valve configuration parts kit 10 in which a second valve configuration is implemented.

In order for these two valve configurations to be generated or implemented, respectively, the valve configuration parts kit 10 comprises a first plate-shaped main body 14 and a plurality of wall-type webs 16 which are attached to the plate-shaped main body 14 and extend from the latter. The webs 16, conjointly with the plate-shaped main body 14, at least in part define fluid paths for a fluid which flows between the webs 16, said fluid being provided, for example, by a fluid source of the pneumatic adjustment device 12 or 13, respectively.

The valve configuration parts kit 10 furthermore has a second main body 18 which is attached to the first main body 14, or a third main body 20 which is attached to the first main body 14.

As can be seen in FIG. 3, the second main body 18 is attached to the main body 14, or is configured thereon, respectively, in such a manner that the second main body 18 does not contact all webs 16 in a fluid-tight manner. Rather, the second main body 18 is attached to the main body 14, or is configured thereon, respectively, in such a manner that the second main body 18 contacts only a first sub-quantity of the plurality of webs 16 in a fluid-tight manner. For example, the second main body 18 is configured in such a manner that said second main body 18 does not contact a web 22 of the plurality of webs 16 in a fluid-tight manner but instead enables an overflow of fluid on the web 22. In that the second main body 18 contacts only a first sub-quantity of the plurality of webs 16 in a fluid-tight manner, thus does not contact the web 22 in a fluid-tight manner, for example, the first main body 14, the second main body 18, and the first sub-quantity of the plurality of webs 16 form a first fluid path system 24 which is schematically indicated by an exemplary flow arrow. This first fluid path system 24 now provides a first valve configuration which can be used for a pneumatic adjustment device 12 as has been described in the context of FIG. 1, for example.

Reference is now to be made to FIG. 4.

The valve configuration parts kit 10 of FIG. 4 has the same first plate-shaped main body 14 having the webs 16 which extend from the plate-shaped main body 14. As opposed to the valve configuration parts kit 10 of FIG. 3, the third main body 20, not the second main body 18, is attached to the first main body 14. Specifically, the third main body 20 is attached to the first main body 14, or is configured thereon, respectively, in such a manner that the third main body 20 again does not contact all webs 16 in a fluid-tight manner but rather does not contact a web 26 in a fluid-tight manner, said web 26 in FIG. 3 however having been contacted by the second main body 18 in a fluid-tight manner. In other words, the third main body 20 is attached to the first main body 14, or is configured thereon, respectively, in such a manner that the third main body 20 contacts a second sub-quantity of the webs 16 in a fluid-tight manner, said second sub-quantity not being identical to the first sub-quantity of the webs 16. For example, the third main body 20 is configured in such a manner that said third main body 20 does not contact the web 26 of the plurality of webs 16 in a fluid-tight manner but instead enables an overflow of fluid on the web 26, whereas the web 22 is contacted by the third main body 20 in a fluid-tight manner. In that the third main body 20 contacts only a second sub-quantity (different from the first sub-quantity) of the plurality of webs 16 in a fluid-tight manner, thus does not contact the web 26 in a fluid-tight manner, for example, the first main body 14, the third main body 20, and the second sub-quantity of the plurality of webs 16 form a second fluid path system 28 which is schematically indicated by an exemplary flow arrow. This second fluid path system 28 now provides a second valve configuration which can be used for a pneumatic adjustment device 13 as has been described in the context of FIG. 2, for example.

To this point, interchangeable separate main bodies 18 and 20 have been discussed in the context of FIGS. 3 and 4. It is however conceivable that the second main body 18 and the third main body 20 are configured in a single main body element 30, as is indicated in principle in FIGS. 3 and 4. This single main body element 30 in a first installed position, as is shown in FIG. 3, for example, can now have the functional mode of the second main body 18 in that said main body element 30 in this first installed position for forming the first valve configuration contacts the first sub-quantity of the plurality of webs 16 in a fluid-tight manner. This single main body element 30 in a second installed position, as is shown in FIG. 4, for example, can however also have the functional mode of the third main body 20 in that said main body element 30 in this second installed position for forming the second valve configuration contacts the second sub-quantity of the plurality of webs 16 in a fluid-tight manner.

Furthermore, in the context of FIGS. 3 and 4, an overflow of fluid by way of the webs 22 (FIG. 3) or 26 (FIG. 6), respectively, has been achieved in that all webs 16 in the direction of extent from the plate-shaped first main body 14 have the same height, and the respective second main body 18, or the third main body 20, respectively, enables or provides, respectively, an overflow duct at the corresponding location. In other embodiments not shown it is of course also imaginable that the webs 16 do not all have the same height but the webs to be selectively provided with an overflow have a correspondingly lower height, and the main bodies 18, 20 which in each case seal in a fluid-tight manner have a protrusion at these locations, said protrusion being compressible under certain circumstances. Alternatively, the main bodies 18, 20 at the locations which seal in each case in a fluid-tight manner can have small webs which, in a manner complementary to the webs of the main body 14, add up so as to form the full height and thus contact one another in a fluid-tight manner; in contrast, the small webs of the main bodies 18, 20 are absent at the locations where an overflow is to be provided, on account of which an overflow duct is provided there.

The fluid-tight connection between the first main body 14 and the second main body 18, or the third main body 20, or the main body element 30, respectively, in the respective installed position according to the prior art can preferably be established by adhesive bonding or fusing (friction welding, laser welding).

Reference is now to be made again to FIG. 1 in which the pneumatic adjustment device 12 is schematically illustrated.

The pneumatic adjustment device 12 uses inter alia the valve configuration parts kit 10, wherein the latter provides the first valve configuration. The first valve configuration in the specific example of FIG. 1 is provided in that the second main body 18 which is illustrated with hatched lines is attached to the plate-shaped first main body 14 in such a manner that the second main body 18 contacts only a first sub-quantity of the plurality of webs 16. Some of the plurality of webs which extend from the plate-shaped main body 14 are provided with the reference sign 16. As can however be seen in FIG. 1, the second main body 18 does not contact all webs 16 in a fluid-tight manner. For example, first webs 32 of the plurality of webs 16 are not contacted in a fluid-tight manner by the second main body 18 so that an overflow of fluid by way of the first webs 32 is enabled there.

The second main body 18 now is configured in such a manner that a first fluid path system 24 is generated by virtue of the contact with the first sub-quantity of the plurality of webs 16 and the permitted overflow by way of the first webs 32, said first fluid path system 24 ultimately generating a first valve configuration which is used in the pneumatic adjustment device 12. In other words, the first sub-quantity of the plurality of webs 16 that is contacted in a fluid-tight manner by the second main body 18, the first main body 14, and the second main body 18 define the first fluid path system 24 which ultimately provides the first valve configuration.

The first valve configuration in the specific example of FIG. 1 now is of such a type that the functionality of two 3/2 valves is achieved so that two fluid bladders can be filled and emptied in a mutually separate manner.

The pneumatic adjustment device 12 to this end has a first fluid bladder 34 for adjusting a seat contact face 36 of a vehicle seat 38. This first fluid bladder 34 is fluidically connected to a first output 40 of the valve configuration parts kit 10. The pneumatic adjustment device 12 furthermore has a second fluid bladder 42 which serves for further adjusting the seat contact face 36 of the vehicle seat 38. This second fluid bladder 42 is fluidically connected to a second output 44 of the valve configuration parts kit 10. The pneumatic adjustment device 12 furthermore has a fluid source 46 which is fluidically connected to an input 48 of the valve configuration parts kit 10. For example, the fluid source 46 can be integrated in the vehicle seat 38, as is shown in the specific example of FIG. 1. In other embodiments not shown, the fluid source 46 can however also be disposed outside the vehicle seat 38.

In order for the separate filling or emptying, respectively, of the two fluid bladders 34, 42 to be enabled, the first fluid path system 24 has an admission-pressure chamber 50 which is fluidically connected to the fluid source 46. This admission-pressure chamber 50 is fluidically connected to a first valve chamber 54 by way of a controllable first 3/2 valve element 52. On account of the second main body 18 moreover providing an overflow duct at one of the first webs 32, a fluidic connection (by way of the first output 40) is established between the first valve chamber 54 and the first fluid bladder 34. The first fluid bladder 34 can now be filled with a fluid provided by the fluid source 46 by correspondingly actuating the first 3/2 valve element 52, or be emptied, wherein a ventilation duct which for the first fluid bladder 36 is present in the pneumatic adjustment device 12 is not shown in FIG. 1 in order to avoid unnecessary complexity.

As is furthermore shown in FIG. 1, the first fluid path system 24 moreover has a second valve chamber 58 which is fluidically connected by way of a controllable second 3/2 valve element 56 and is fluidically separated from the first valve chamber 54. On account of the second main body 18 moreover enabling an overflow at the first webs 32, a fluidic connection between the admission-pressure chamber 50 and the second 3/2 valve element 56 is achieved, on the one hand, and a fluidic connection between the second valve chamber 58 and the second output 44 of the valve configuration parts kit 10 is achieved, on the other hand. It is possible on account thereof that the second fluid bladder 42 can also be filled with a fluid provided by the fluid source 46, or be emptied, respectively, by correspondingly actuating the second 3/2 valve element 56, wherein a ventilation duct which is present for the second fluid bladder 42 is again not shown in FIG. 1.

Summarizing, it can thus be established that the valve configuration parts kit 10 by means of the use of the second main body 18 provides a first valve configuration by way of which a pneumatic adjustment device 12 in which two fluid bladders 34, 42 can be filled and emptied in a mutually independent manner can be achieved.

Reference is now to be made to FIG. 2 in which the pneumatic adjustment device 13 is schematically illustrated.

The pneumatic adjustment device 13 again uses the valve configuration parts kit 10, wherein the latter now provides the second valve configuration. The second valve configuration is provided, for example, in that the third main body 20 which is illustrated with hatched lines is attached to the plate-shaped first main body 14 in such a manner that the third main body 20 contacts a second sub-quantity of the plurality of webs 16. Some of the plurality of webs which extend from the plate-shaped main body 14 are again provided with the reference sign 16. As can however be seen in FIG. 2, the third main body 20 does not contact all webs 16 in a fluid-tight manner. For example, second webs 60 of the plurality of webs 16 are not contacted in a fluid-tight manner by the third main body 20 so that an overflow of fluid by way of the second webs 60 is enabled there.

The third main body 20 now is configured in such a manner that a second fluid path system 28 is generated by virtue of the contact with the second sub-quantity of the plurality of webs 16 and the permitted overflow by way of the second webs 60, said second fluid path system 28 ultimately generating a second valve configuration which is used in the pneumatic adjustment device 13. In other words, the second sub-quantity of the plurality of webs 16 that is contacted in a fluid-tight manner by the third main body 20, the first main body 14, and the third main body 20 define the second fluid path system 28 which ultimately provides the second valve configuration.

The second valve configuration in the specific example of FIG. 2 is now of such a type that the functionality is achieved by a single 3/3 valve so that a fluid bladder can be filled and emptied in a controlled manner, and the pressure in the fluid bladder can moreover be maintained.

The pneumatic adjustment device 13 to this end has a fluid bladder 62 which again serves for further adjusting the seat contact face 36 of the vehicle seat 38. This fluid bladder 62 can be a separate fluid bladder. Said fluid bladder 62 can however also be either of the two fluid bladders 34, 42 of FIG. 1.

The fluid bladder 62 is fluidically connected to an output 64 of the valve configuration parts kit 10. As becomes evident from a comparison with FIG. 1, the fluid bladder 62 is connected to the second output 44.

The pneumatic adjustment device 13 furthermore has the fluid source 46 which is fluidically connected to the input 48 of the valve configuration parts kit 10.

In order for the controlled filling or emptying, respectively, of the fluid bladder 62 to be enabled, the second fluid path system 28 again has the admission-pressure chamber 50 which is fluidically connected to the fluid source 46. This admission-pressure chamber 50 is fluidically connected to the first valve chamber 54 by way of the controllable first 3/2 valve element 52. On account of the third main body 20 now not enabling an overflow duct to the first output 40 but instead contacting this web 16 in a fluid-tight manner, an uncontrolled outflow of fluid is prevented. The third main body 20 however simultaneously enables an overflow by way of either of the second webs 60 such that a fluidic connection is generated between the first valve chamber 54 and the second valve chamber 58.

This second valve chamber 58 is now fluidically connected to the second 3/2 valve element 56. However, the third main body 20 by virtue of the fluid-tight contact with one of the webs 16 prevents a fluidic connection between the second 3/2 valve element 56 and the admission-pressure chamber 50. This can be seen from the fact that in FIG. 1 the overflow-capable fist web 32 is now contacted by the third main body 20 in a fluid-tight manner. The third main body 20 however simultaneously enables an overflow by way of either of the second webs 60 such that a third valve chamber 66 which by means of the controllable second 3/2 valve element 56 can selectively be fluidically connected to the second valve chamber 58, is now achieved. This third valve chamber 66 is now fluidically connected to the fluid bladder 62 by way of the output 64, or the second output 44, respectively.

The fluid bladder 62 can now be selectively filled, emptied (wherein a ventilation duct for the fluid bladder 62 is again not shown in FIG. 2), or the pressure in the fluid bladder 62 can be maintained, by correspondingly actuating the first and the second 3/2 valve elements 52, 56.

Summarizing, it can thus be established that the valve configuration parts kit 10 by means of the use of the third main body 20 provides a second valve configuration by way of which a pneumatic adjustment device 13 in which a fluid bladder 62 can be selectively filled and emptied and the pressure in the fluid bladder 62 can be maintained can be achieved. This second valve configuration is achieved solely in that the second main body 18 (see FIG. 1) is replaced by the third main body 20 (see FIG. 2).

As has already been mentioned, a changeover from the first valve configuration to the second valve configuration can however also take place in that the second main body 18 and the third main body 20 are configured in a single main body element 30, and the main body element 30 in a first installed position generates the first valve configuration, and in a second installed position generates the second valve configuration.

While only two different valve configurations have been discussed up to this point in the context of FIGS. 1 to 4, it is of course also possible in other embodiments that more than two different valve configurations can be provided by means of the valve configuration parts kit 10. For example, further (fourth, fifth, etc.) main bodies can be configured in such a manner that third, fourth, etc., valve configurations can be provided by the same valve configuration parts kit 10.

In further embodiments not shown, the second, third, fourth, etc., main body of the valve configuration parts kit can also be configured in the form of a film which is correspondingly welded to the webs 16 in such a manner that the respective first, second, third, etc., valve configuration is provided by the valve configuration parts kit 10. For example, the overflow ducts in this embodiment are created in that the film there is not adhesively bonded or welded to the webs of the first main body 14, and said film by the operating pressure, which is above the ambient pressure, moreover can be bulged outward so as to achieve a corresponding overflow possibility, or an overflow duct, respectively.

The invention claimed is:

1. A valve configuration parts kit for providing at least two valve configurations for a pneumatic adjustment device of a vehicle seat, having:
 a first plate-shaped main body;
 a plurality of wall-type webs which are attached to the plate-shaped main body and extend from the plate-shaped main body and which, conjointly with the plate-shaped main body at least in part define fluid paths for fluid that flows between the webs; and
 a second main body which is configured to be attached to the first main body; or a third main body which is configured to be attached to the first main body; wherein the second main body is attached to the first main body in such a manner that the second main body contacts a first sub-quantity of the plurality of webs in a fluid-tight manner such that the first main body, the second main body, and the first sub-quantity of the plurality of webs define a first fluid path system for providing a first valve configuration, the third main body is attached to the first main body in such a manner that the third main body contacts a second sub-quantity, different from the first sub-quantity, of the plurality of webs in a fluid-tight manner such that the first main body, the third main body, and the second sub-quantity of the plurality of webs define a second fluid path system for providing a second valve configuration, different from the first valve configuration, and the webs in the direction of extent have the same height, and the second main body enables an overflow of the fluid only at predetermined first webs, and the third main body enables an overflow of the fluid only at predetermined second webs.

2. The valve configuration parts kit as claimed in claim 1, wherein the second main body and the third main body are configured in a single main body element which in a first installed position for defining the first valve configuration contacts the first sub-quantity of the plurality of webs in a fluid-tight manner, and in a second installed position for defining the second valve configuration contacts the second sub-quantity of the plurality of webs in a fluid-tight manner.

3. The valve configuration parts kit as claimed claim 1, wherein a functionality of two 3/2 valves is enabled in the first valve configuration, and a functionality of one 3/3 valve is enabled in the second valve configuration.

4. The valve configuration parts kit as claimed in claim 1, wherein the first fluid path system which in the first valve configuration is defined by the first main body, the second main body, and the first sub-quantity of the plurality of webs has:

an admission-pressure chamber which is able to be fluidically connected to a fluid source;

a first valve chamber which by way of a first valve element is fluidically connected to the admission-pressure chamber and is able to be fluidically connected to a first fluid bladder of the pneumatic adjustment device;

a second valve chamber which is fluidically separated from the first valve chamber and by way of a second valve element is fluidically connected to the admission-pressure chamber and is able to be fluidically connected to a second fluid bladder of the pneumatic adjustment device.

5. The valve configuration parts kit as claimed in claim 1, wherein the second fluid path system which in the second valve configuration is defined by the first main body, the third main body, and the second sub-quantity of the plurality of webs has:

an admission-pressure chamber which is able to be fluidically connected to a fluid source;

a first valve chamber which by way of a first valve element is fluidically connected to the admission-pressure chamber;

a second valve chamber which is fluidically connected to the first valve chamber; and a third valve chamber which by way of a second valve element is fluidically connected to the second valve chamber and is able to be fluidically connected to a fluid bladder.

6. The valve configuration parts kit as claimed in claim 5, furthermore comprising:

the first valve element which in the first valve configuration as well as in the second valve configuration fluidically connects the admission-pressure chamber to the first valve chamber; and the second valve element which in the first valve configuration fluidically connects the admission-pressure chamber to the second valve chamber, and in the second valve configuration fluidically connects the second valve chamber to the third valve chamber.

7. A pneumatic adjustment device for adjusting a contour of a seat contact face of a vehicle seat, comprising:

a valve configuration parts kit as claimed in claim 6;

a fluid source which is fluidically connected to the admission-pressure chamber;

a first fluid bladder for adjusting the contour of the seat contact face; and a second fluid bladder for further adjusting the contour of the seat contact face; wherein in the first valve configuration of the valve configuration parts kit the first fluid bladder is fluidically connected to the first valve chamber, and the second fluid bladder is fluidically connected to the second valve chamber.

8. The valve configuration parts kit as claimed in claim 5, furthermore comprising:

the first valve element which in the first valve configuration as well as in the second valve configuration fluidically connects the admission-pressure chamber to the first valve chamber; and the second valve element which in the first valve configuration fluidically connects the admission-pressure chamber to the second valve chamber, and in the second valve configuration fluidically connects the second valve chamber to the third valve chamber.

9. A pneumatic adjustment device for adjusting a contour of a seat contact face of a vehicle seat, comprising:

a valve configuration parts kit as claimed in claim 8;

a fluid source which is fluidically connected to the admission-pressure chamber; and a fluid bladder for adjusting the contour of the seat contact face; wherein in the second valve configuration of the valve configuration parts kit the fluid bladder is fluidically connected to the third valve chamber.

\* \* \* \* \*